United States Patent
Kling et al.

(10) Patent No.: US 10,132,174 B2
(45) Date of Patent: Nov. 20, 2018

(54) AIRCRAFT BLADE LOCK RETAINER

(71) Applicant: United Technologies Corporation, Hartford, CT (US)

(72) Inventors: Colin J. Kling, Newington, CT (US); Thomas J. Robertson, Glastonbury, CT (US); Carney R. Anderson, East Haddam, CT (US); James J. McPhail, New London, CT (US)

(73) Assignee: United Technologies Corporation, Farmington, CT (US)

( * ) Notice: Subject to any disclaimer, the term of this patent is extended or adjusted under 35 U.S.C. 154(b) by 638 days.

(21) Appl. No.: 14/685,030

(22) Filed: Apr. 13, 2015

(65) Prior Publication Data

US 2016/0298469 A1 Oct. 13, 2016

(51) Int. Cl.
   *F01D 5/32* (2006.01)
   *F01D 5/28* (2006.01)
   *F01D 5/30* (2006.01)
   *F02K 7/06* (2006.01)

(52) U.S. Cl.
   CPC .............. *F01D 5/326* (2013.01); *F01D 5/282* (2013.01); *F01D 5/3015* (2013.01); *F01D 5/3076* (2013.01); *F02K 7/06* (2013.01); *F05D 2220/36* (2013.01); *F05D 2230/54* (2013.01); *F05D 2300/121* (2013.01); *F05D 2300/133* (2013.01); *F05D 2300/173* (2013.01);
   (Continued)

(58) Field of Classification Search
   CPC .... F01D 5/3015; F01D 5/3007; F01D 5/3076; F01D 5/326; F04D 29/322
   See application file for complete search history.

(56) References Cited

U.S. PATENT DOCUMENTS

| | | | | |
|---|---|---|---|---|
| 4,397,609 | A * | 8/1983 | Kochendorfer | F01D 5/021 416/204 A |
| 6,951,448 | B2 * | 10/2005 | Duesler | F01D 5/326 416/220 R |

(Continued)

FOREIGN PATENT DOCUMENTS

WO    2011090970    7/2011

OTHER PUBLICATIONS

Extended European Search Report dated Aug. 19, 2016 in European Application No. 16164962.9.

*Primary Examiner* — Jason Shanske
*Assistant Examiner* — Sabbir Hasan
(74) *Attorney, Agent, or Firm* — Snell & Wilmer L.L.P.

(57) ABSTRACT

The present disclosure provides devices related to aircraft engine fan assemblies and blade lock retainers. In various embodiments, a blade lock retainer is formed from sheet metal and comprises an annular ring portion, an outer retainer tab portion, and an inner tab portion. In various embodiments, the outer retainer tab portion is disposed on an outer circumference of the annular ring portion, oriented substantially perpendicular to the annular ring portion, and extends in an aft direction from the annular ring portion. In various embodiments, the inner retainer tab portion is disposed on an inner circumference of the annular ring portion and radially aligned with the outer retainer tab portion, oriented substantially perpendicular to the annular ring portion, and extends in a forward direction from the annular ring portion.

15 Claims, 4 Drawing Sheets

(52) U.S. Cl.
CPC .. *F05D 2300/174* (2013.01); *F05D 2300/175* (2013.01); *F05D 2300/603* (2013.01); *Y02T 50/672* (2013.01)

(56) References Cited

U.S. PATENT DOCUMENTS

| | | | | |
|---|---|---|---|---|
| 6,962,480 | B2* | 11/2005 | Nguyen | F01D 9/026 415/108 |
| 8,449,260 | B2* | 5/2013 | Xie | F01D 5/06 416/189 |
| 8,459,954 | B2* | 6/2013 | Anderson | F01D 5/3015 29/889.21 |
| 8,460,118 | B2* | 6/2013 | Anderson | F01D 5/06 464/182 |
| 2003/0194318 | A1 | 10/2003 | Duesler et al. | |
| 2013/0051986 | A1 | 2/2013 | Anderson et al. | |

* cited by examiner

AIRCRAFT BLADE LOCK RETAINER

FIELD OF THE DISCLOSURE

The present disclosure relates to aircraft engine fan assemblies and, more particularly, to blade lock retainers.

BACKGROUND OF THE DISCLOSURE

A turbofan engine, such as those used in modern aircraft, typically includes an engine fan assembly, a compressor, a combustion section, and a turbine. A conventional engine fan assembly may comprise a plurality of fan blades, a spinner, a hub, a blade lock, and a blade lock retainer. Typical blade lock retainers comprise titanium and are manufactured by forging and subtractive metal machining techniques. Metal forging and machining of blade lock retainers result in metal waste and requires subsequent ultrasound inspection of the forged blade lock retainer to detect cracks or voids created during the forging process.

SUMMARY OF THE DISCLOSURE

In various embodiments, the present disclosure provides a blade lock retainer. A blade lock retainer may be formed from sheet metal and may comprise an annular ring portion, an outer retainer tab portion, and an inner retainer tab portion. In various embodiments, a blade lock retainer may further comprise a rivet aperture and/or a bolt aperture.

In various embodiments, the present disclosure provides an engine fan assembly. An engine fan assembly may comprise a blade lock retainer formed from sheet metal, and a spinner having an aft flange. In various embodiments, the engine fan assembly may further comprise a plurality of rivets and/or bolts. In various embodiments, the blade lock retainer may be configured to be coupled to the aft flange of the spinner and to a hub. In various embodiments, the engine fan assembly may further comprise a spacer disposed between the aft flange and the blade lock retainer.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

In the context of the present disclosure, devices may find particular use in connection with aircraft engine fan assemblies in gas turbine engines. However, various aspects of the disclosed embodiments may be adapted for optimized performance with engine fan assemblies in a variety of engines. As such, numerous applications of the present disclosure may be realized.

Figure 1:
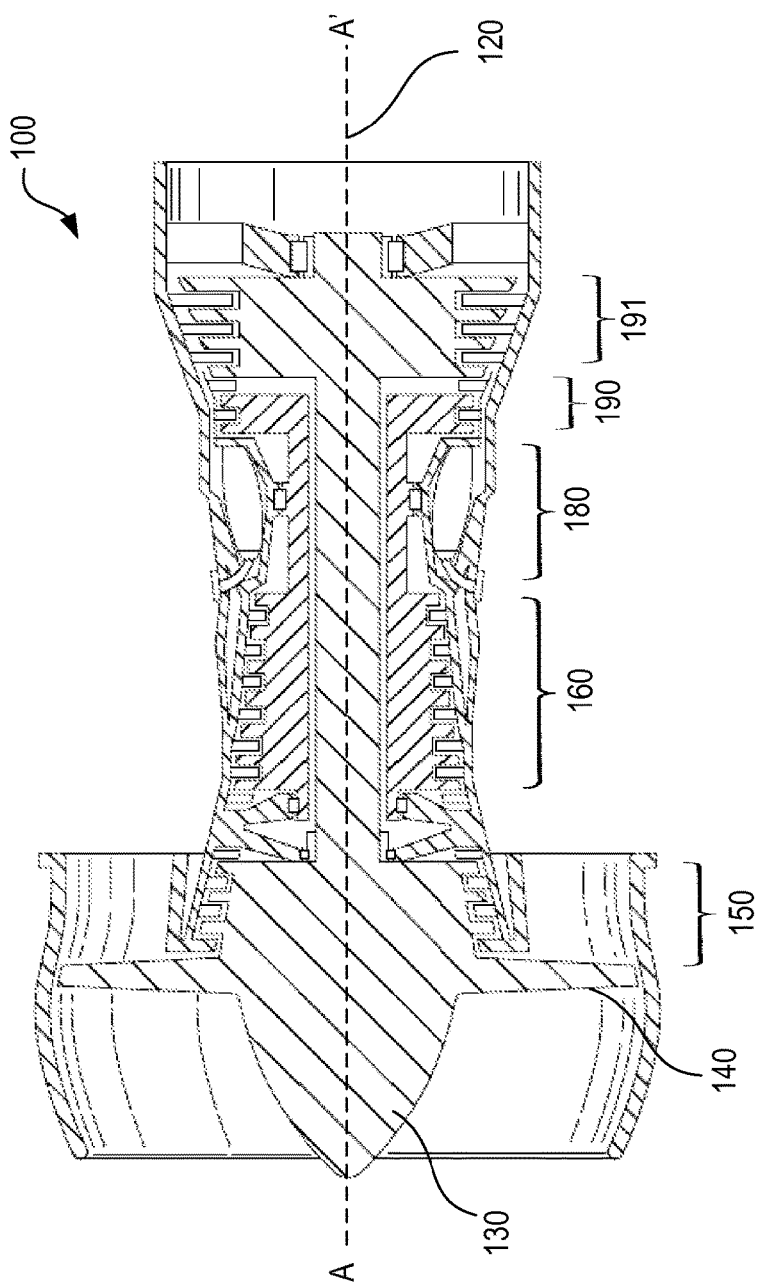
FIG. 1 illustrates a cross section view of a gas turbine engine in accordance with various embodiments.

As used herein and with reference to FIG. 1, the terms "forward" and "aft" are used to describe relative positions and/or directions of travel in relation to an axis of rotation 120 marked A-A', with A being forward of A' and A' being aft of A. For example, a component forward of another component should be understood to be closer to A than to A', and a component aft of another component should be understood to be closer to A' than to A. For example, movement in a forward direction should be understood to be in a direction towards A, and movement in an aft direction should be understood to be in a direction towards A'.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a spinner 130, a fan 140, compressor sections 150 and 160, a combustion section 180, and turbine sections 190, 191. The fan 140 may drive air into compressor sections 150, 160, which further drive air along a core flow path for compression and communication into the combustion section 180. Air compressed in the compressor sections 150, 160 may be mixed with fuel and burned in combustion section 180 and expanded across the turbine sections 190, 191. FIG. 1 provides a general understanding of the sections in a gas turbine engine, and is not intended to limit the disclosure. The present disclosure may extend to all types of applications and to all types of turbine engines, including turbofan engines, turboprop engines, and the like.

Figure 2A:
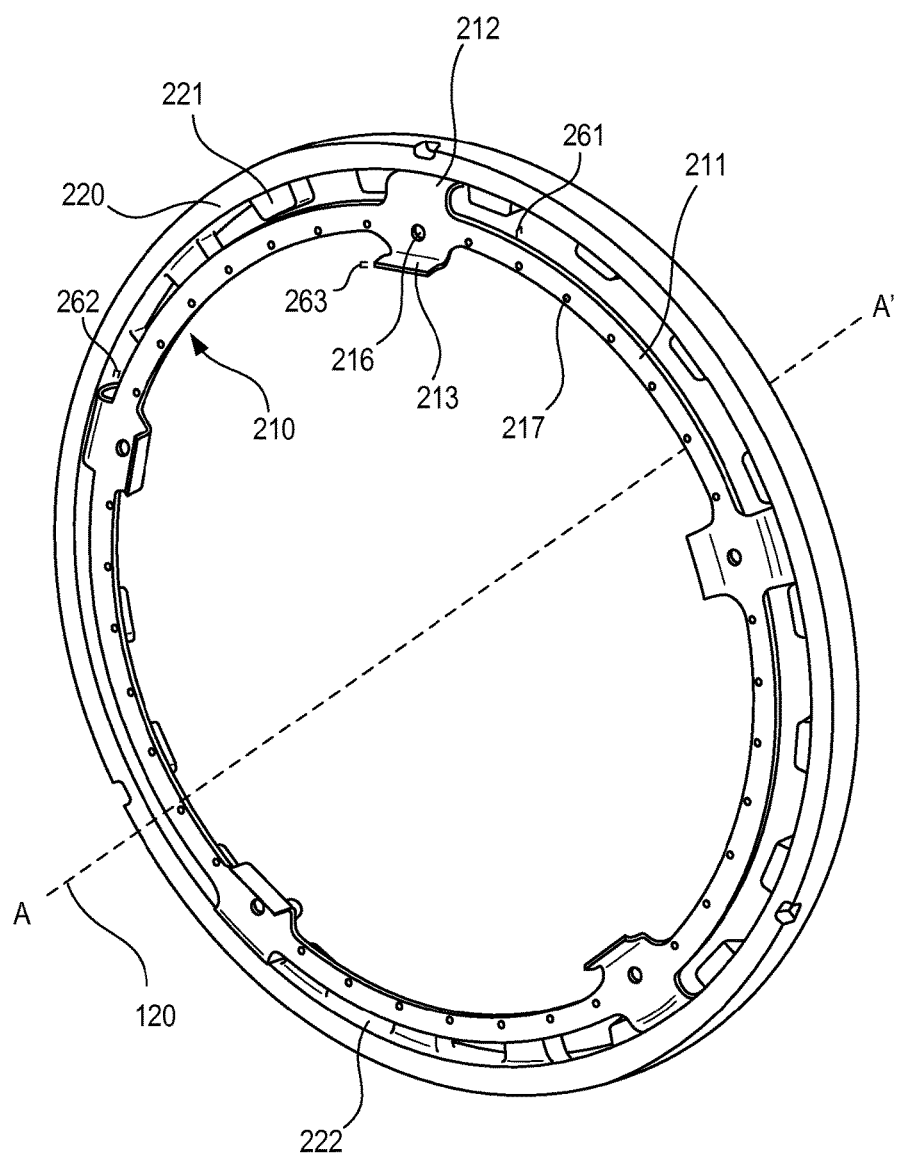
FIG. 2a illustrates a perspective view of portions of an aircraft engine fan assembly in accordance with various embodiments.
Figure 2B:
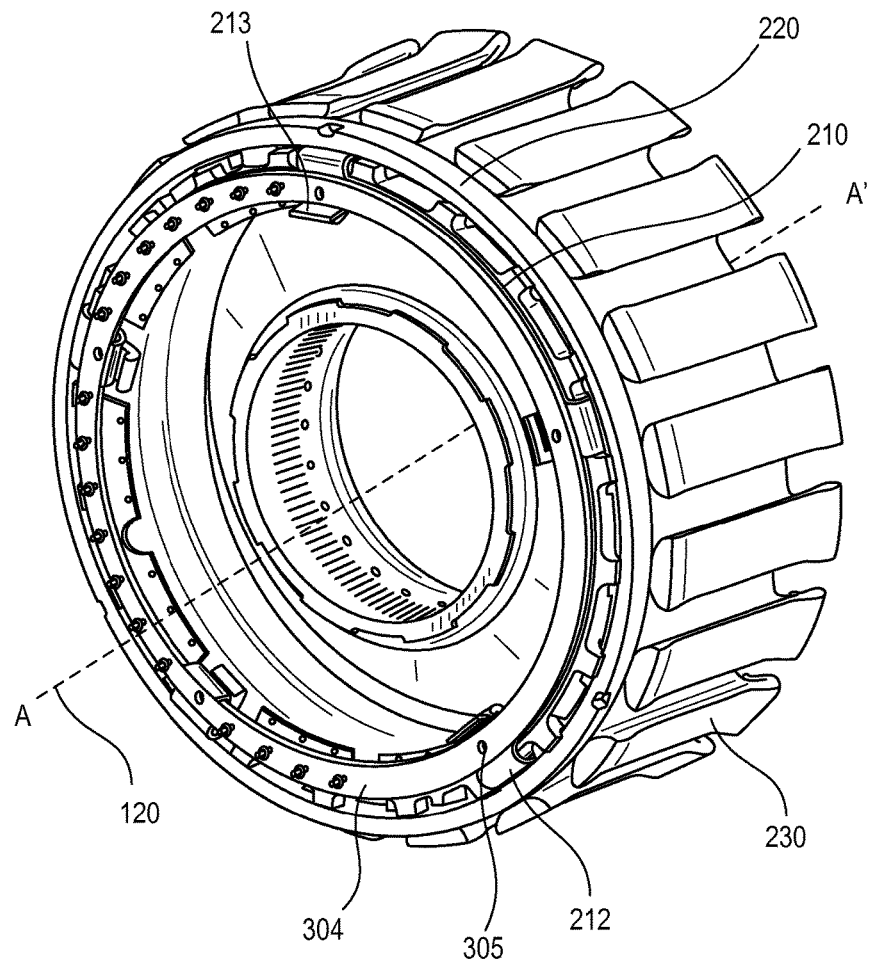
FIG. 2b illustrates a perspective view of portions of an aircraft engine fan assembly in accordance with various embodiments.

With reference to FIGS. 2a and 2b, in various embodiments, an engine fan assembly may comprise a blade lock 220 and a blade lock retainer 210. In various embodiments, blade lock 220 may comprise an annular ring having a blade lock inner circumference 222. In various embodiments, a plurality of blade lock lugs 221 may be disposed on blade lock inner circumference 222 and may extend radially inward therefrom. In various embodiments, the blade lock 220 may be configured to restrict the movement of blades in an axial direction, such as a forward direction or an aft direction. In various embodiments, the blade lock 220 may be coupled to a plurality of blades and to a hub 230 by blade lock retainer 210.

In various embodiments, blade lock retainer 210 may comprise an annular ring portion 211, an outer retainer tab portion 212, and an inner retainer tab portion 213. In various embodiments, annular ring portion 211 may be integral to blade lock retainer 210 and may comprise an annular ring oriented about axis of rotation 120. In various embodiments, annular ring portion 211 may comprise an inner circumference and an outer circumference.

In various embodiments, outer retainer tab portion 212 may be disposed on an outer circumference of annular ring portion 211, may be oriented substantially perpendicular to annular ring portion 211, and may extend in an aft direction from the annular ring portion 211. In various embodiments, outer retainer tab portion 212 may be integral to blade lock retainer 210. In various embodiments, inner retainer tab portion 213 may be disposed on the inner circumference of annular ring portion 211 and may be radially aligned with outer retainer tab portion 212. In various embodiments, inner retainer tab portion 213 may be oriented substantially perpendicular to annular ring portion 211 and may extend in a forward direction from annular ring portion 211. In various embodiments, inner retainer tab portion 213 may be integral to blade lock retainer 210.

In various embodiments, blade lock retainer 210 may comprise at least one outer retainer tab portion 212 and at least one inner retainer tab portion 213. In various embodiments, blade lock retainer 210 may comprise a plurality of outer retainer tab portions 212 and a plurality of inner retainer tab portions 213.

In various embodiments, blade lock retainer 210 may comprise formed sheet metal. In various embodiments, the sheet metal may comprise at least one of stainless steel, aluminum, titanium, nickel, and/or alloys thereof. However, in various embodiments, the sheet metal may comprise any metal, alloy, and/or composite made up of various metals and/or alloys suitable for use in an engine fan assembly. In various embodiments, blade lock retainer 210 may be manufactured by cutting, stamping, rolling, forming, punching, and/or bending the sheet metal. In various embodiments, the sheet metal may be substantially flat and/or have a substantially uniform thickness.

In various embodiments, blade lock retainer 210 may comprise a bolt aperture 216. In various embodiments, bolt aperture 216 may be disposed in annular ring portion 211 and may extend from a forward face of annular ring portion 211 to an aft face of annular ring portion 211. In various embodiments, bolt aperture 216 may be radially aligned with at least one of outer retainer tab portion 212 and inner retainer tab portion 213. In various embodiments, blade lock retainer 210 may comprise a plurality of bolt apertures 216.

In various embodiments, blade lock retainer 210 may comprise a rivet aperture 217. In various embodiments, rivet aperture 217 may be disposed in annular ring portion 211 and may extend from a forward face of annular ring portion 211 to an aft face of annular ring portion 211. In various embodiments, rivet aperture 217 may not be radially aligned with outer retainer tab portion 212 or inner retainer tab portion 213. In various embodiments, blade lock retainer 210 may comprise a plurality of rivet apertures 217.

In various embodiments, blade lock retainer 210 may be configured to restrict the movement of various engine fan assembly components in various directions. For example, in various embodiments, outer retainer tab portion 212 may be configured to have an interference fit with blade lock inner circumference 222, thereby restricting the movement of blade lock 220 relative to blade lock retainer 210 in a radial direction and/or in a circumferential direction.

In various embodiments, blade lock retainer 210 may comprise a substantially uniform thickness. For example, in various embodiments, annular ring portion 211 may comprise a first thickness 261, outer retainer tab portion 212 may comprise a second thickness 262, and inner retainer tab portion 213 may comprise a third thickness 263. In various embodiments, the first thickness 261 may be substantially similar to the second thickness 262 and the third thickness 263. In various embodiments, the first thickness 261 may be greater than at least one of the second thickness 262 and the third thickness 263.

Figure 3:
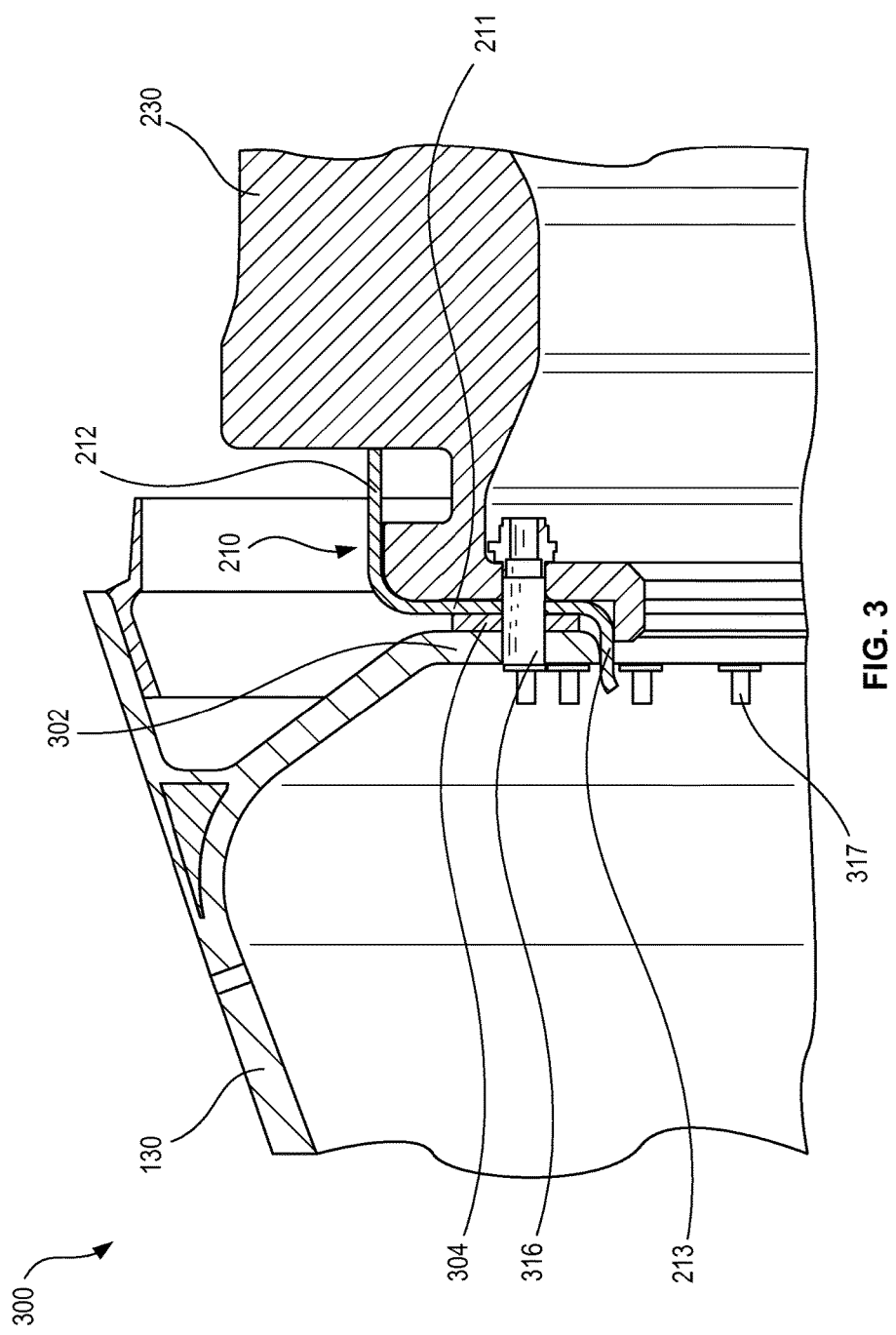
FIG. 3 illustrates a cross section view of a portion of an aircraft engine fan assembly in accordance with various embodiments.

In various embodiments and with reference to FIG. 3, an engine fan assembly 300 may comprise a spinner 130, a hub 230, and a blade lock retainer 210. In various embodiments, spinner 130 may comprise an aft flange 302 disposed on an aft portion of spinner 130 and extending radially inward from an inner face of spinner 130. In various embodiments, blade lock retainer 210 may be disposed between aft flange 302 and hub 230. In various embodiments, blade lock retainer 210 may be coupled to spinner 130 by a plurality of rivets 317. In various embodiments, blade lock retainer 210 may be coupled to hub 230 by at least one bolt 316. With momentary reference to FIG. 2a, in various embodiments, rivets 317 may be disposed in rivet apertures 217 of blade lock retainer 210, and bolt 316 may be disposed in bolt aperture 216 of blade lock retainer 210. In various embodiments, engine fan assembly 300 may comprise a plurality of bolts 316 configured to couple blade lock retainer 210 to hub 230.

In various embodiments, spinner 130 may comprise a spacer portion disposed on an aft face of aft flange 302. In various embodiments, the spacer portion may be integral to spinner 130 and may be configured to be disposed between aft flange 302 and blade lock retainer 210. In various embodiments, spacer portion may comprise an annular ring. In various embodiments, spacer portion and/or aft flange 302 may comprise a first chamfered edge. The first chamfered edge may be disposed on a circumference of aft flange 302 radially inward and aft of other portions of aft flange 302. In various embodiments, the first chamfered edge may be configured to allow an aft face of spacer portion and/or aft flange 302 to be in contact with a forward face of annular ring portion 211 in substantially parallel planes.

In various embodiments, engine fan assembly 300 may further comprise a spacer 304. In various embodiments, spacer 304 may be disposed between aft flange 302 and blade lock retainer 210. With reference to FIGS. 2b and 3, in various embodiments, spacer 304 may comprise an annular ring. In various embodiments, spacer 304 may comprise a plurality of spacer apertures 305. In various embodiments, spacer apertures 305 may be configured to surround bolts 316 and/or rivets 317. In various embodiments, spacer 304 may be configured to be coupled to aft flange 302 by at least one rivet 317, and/or coupled to blade lock retainer 210 by at least one bolt 316. In various embodiments, spacer 304 may comprise a second chamfered edge. The second chamfered edge may be disposed on a circumference of spacer 304 radially inward and aft of other portions of spacer 304. In various embodiments, the second chamfered edge may be configured to allow an aft face of spacer 304 to be in contact with a forward face of annular ring portion 211 in substantially parallel planes.

With reference to FIGS. 2a and 3, in various embodiments, spacer 304 may comprise a first radial length, and annular ring portion 211 may comprise a second radial length. In various embodiments, first radial length may comprise the distance between an inner circumference of spacer 304 and an outer circumference of spacer 304, and second radial length may comprise the distance between an inner circumference of annular ring portion 211 and an outer circumference of annular ring portion 211. In various embodiments, the first radial length may be substantially similar to the second radial length. In various embodiments, the first radial length may be less than the second radial length.

In various embodiments, spacer 304 may comprise at least one of titanium, aluminum, stainless steel, nickel, or alloys thereof. In various embodiments, spacer 304 may comprise a composite material such as, for example, a fiberglass laminate. However, in various embodiments, the spacer may comprise any metal, alloy, plastic, and/or composite made up of various metals, alloys, and/or plastics, that is suitable for use in an engine fan assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An engine fan assembly, comprising:
   a spinner having an aft flange and a spacer integral to the spinner; and
   a blade lock retainer coupled to the aft flange of the spinner, wherein the spacer is disposed between the aft flange of the spinner and the blade lock retainer, the blade lock retainer comprising:
   an annular ring portion,
   an outer retainer tab portion, disposed on an outer circumference of the annular ring portion, oriented substantially perpendicular to the annular ring portion, and extending in an aft direction from the annular ring portion, and
   an inner retainer tab portion, disposed on an inner circumference of the annular ring portion and radially aligned with the outer retainer tab portion, oriented substantially perpendicular to the annular ring portion, and extending in a forward direction from the annular ring portion, wherein the blade lock retainer is formed from sheet metal;
   a plurality of rivet apertures; and
   at least one bolt aperture disposed in the annular ring portion and radially aligned with the outer retainer tab portion and the inner retainer tab portion;
   at least one bolt, the blade lock retainer installable to a hub by the at least one bolt aperture, the at least one bolt aperture configured to receive the at least one bolt;
   at least one rivet, the blade lock retainer coupled to the aft flange of the spinner by at least one rivet aperture from the plurality of rivet apertures, the at least one rivet aperture configured to receive the at least one rivet.

2. The engine fan assembly of claim 1, wherein the annular ring portion, the outer retainer tab portion, and the inner retainer tab portion comprise a substantially uniform thickness.

3. The engine fan assembly of claim 1, wherein:
   the annular ring portion comprises a first thickness;
   the outer retainer tab portion comprises a second thickness;
   the inner retainer tab portion comprises a third thickness; and
   the first thickness is greater than at least one of the second thickness and the third thickness.

4. The engine fan assembly of claim 1, wherein the blade lock retainer comprises at least one of a metal and a metal alloy.

5. The engine fan assembly of claim 4, wherein the metal comprises at least one of titanium and aluminum.

6. The engine fan assembly of claim 4, wherein the metal alloy comprises a nickel alloy.

7. An aircraft engine fan assembly, comprising:
   a spinner having an aft flange and a spacer, the spacer integral to the spinner;
   a hub:
   a blade lock retainer coupled to the aft flange of the spinner, wherein the spacer is disposed between the aft flange of the spinner and the blade lock retainer, and wherein the blade lock retainer is formed from sheet metal and comprises:
   an annular ring portion;
   an outer retainer tab portion, disposed on an outer circumference of the annular ring portion, oriented perpendicularly to the annular ring portion, and extending in an aft direction from the annular ring portion;

an inner retainer tab portion, disposed on an inner circumference of the annular ring portion and radially aligned with the outer retainer tab portion, oriented perpendicularly to the annular ring portion, and extending in a forward direction from the annular ring portion;
a plurality of rivet apertures; and
at least one bolt aperture disposed in the annular ring portion and radially aligned with the outer retainer tab portion and the inner retainer tab portion;
at least one bolt, the blade lock retainer coupled to the hub by the at least one bolt aperture, the at least one bolt aperture configured to receive the at least one bolt; and
at least one rivet, the blade lock retainer coupled to the aft flange of the spinner by at least one rivet aperture from the plurality of rivet apertures, the at least one rivet aperture configured to receive the at least one rivet.

8. The aircraft engine fan assembly of claim 7, wherein the blade lock retainer comprises at least one of a metal and a metal alloy.

9. The aircraft engine fan assembly of claim 8, wherein the metal comprises at least one of titanium and aluminum.

10. The aircraft engine fan assembly of claim 8, wherein the metal alloy comprises a nickel alloy.

11. The aircraft engine fan assembly of claim 7, wherein a first radial length of the spacer is equal to a second radial length of the annular ring portion.

12. The aircraft engine fan assembly of claim 7, wherein a first radial length of the spacer is less than a second radial length of the annular ring portion.

13. The aircraft engine fan assembly of claim 7, wherein the spacer comprises titanium.

14. The aircraft engine fan assembly of claim 7, wherein the spacer comprises aluminum.

15. The aircraft engine fan assembly of claim 7, wherein the spacer comprises a composite material.

* * * * *